(12) United States Patent
Zhang et al.

(10) Patent No.: US 11,979,398 B2
(45) Date of Patent: May 7, 2024

(54) PRIVACY-PRESERVING VOICEPRINT AUTHENTICATION APPARATUS AND METHOD

(71) Applicant: Nokia Technologies Oy, Espoo (FI)

(72) Inventors: Rui Zhang, Xi'an (CN); Zheng Yan, Espoo (FI)

( * ) Notice: Subject to any disclaimer, the term of this patent is extended or adjusted under 35 U.S.C. 154(b) by 966 days.

(21) Appl. No.: 16/962,462

(22) PCT Filed: Jan. 22, 2018

(86) PCT No.: PCT/CN2018/073635
§ 371 (c)(1),
(2) Date: Jul. 15, 2020

(87) PCT Pub. No.: WO2019/140689
PCT Pub. Date: Jul. 25, 2019

(65) Prior Publication Data
US 2021/0075787 A1 Mar. 11, 2021

(51) Int. Cl.
*H04L 9/40* (2022.01)
*G06F 21/32* (2013.01)
(Continued)

(52) U.S. Cl.
CPC .......... *H04L 63/0861* (2013.01); *G10L 13/02* (2013.01); *G10L 17/02* (2013.01);
(Continued)

(58) Field of Classification Search
CPC ... H04L 63/0861; H04L 9/3231; G10L 13/02; G10L 17/02; G10L 17/04; G10L 17/06;
(Continued)

(56) References Cited

U.S. PATENT DOCUMENTS

2003/0074568 A1* 4/2003 Kinsella ................. G06F 21/34
713/186
2003/0130893 A1 7/2003 Farmer
(Continued)

FOREIGN PATENT DOCUMENTS

CN 103391201 A 11/2013
CN 103730120 A 4/2014
(Continued)

OTHER PUBLICATIONS

Meng H, Ching PC et al. "The Multi-biometric, Multi-device and Multilingual (M3) Corpus", International Workshop on Multimodal User Authentication. (Year: 2006).*
(Continued)

*Primary Examiner* — Darren B Schwartz
(74) *Attorney, Agent, or Firm* — Capitol Patent & Trademark Law Firm, PLLC

(57) ABSTRACT

A voiceprint authentication apparatus is provided, comprising: a voice receiving module configured to receive a user's voices in different speaking modes; a feature extraction module configured to extract respective sets of voice features from the user's voices in different speaking modes; a synthesis module configured to generate a first voiceprint template by synthesizing the respective sets of voice features; and a first communication module configured to send the first voiceprint template to a server to authenticate the user, wherein the user's voices and the respective sets of voice features are not sent to the server. A corresponding voice authentication method, as well as a computer readable medium, are also provided.

20 Claims, 6 Drawing Sheets

(51) Int. Cl.

| | |
|---|---|
| *G06Q 20/40* | (2012.01) |
| *G10L 13/02* | (2013.01) |
| *G10L 17/02* | (2013.01) |
| *G10L 17/04* | (2013.01) |
| *G10L 17/06* | (2013.01) |
| *G10L 17/24* | (2013.01) |
| *G10L 25/24* | (2013.01) |
| *H04L 9/32* | (2006.01) |
| *H04W 12/06* | (2021.01) |

(52) U.S. Cl.
CPC .............. *G10L 17/04* (2013.01); *G10L 17/06* (2013.01); *G10L 17/24* (2013.01); *G10L 25/24* (2013.01)

(58) Field of Classification Search
CPC ... G10L 17/24; G10L 25/24; G06Q 20/40145; G06F 21/32; H04W 12/06
See application file for complete search history.

(56) References Cited

U.S. PATENT DOCUMENTS

| | | | |
|---|---|---|---|
| 2005/0108011 A1 | 5/2005 | Keough et al. | |
| 2007/0038868 A1 | 2/2007 | Yu et al. | |
| 2007/0180261 A1 | 8/2007 | Akkermans et al. | |
| 2008/0169903 A1* | 7/2008 | Fein ................. | G07C 9/257 340/5.84 |
| 2015/0127342 A1* | 5/2015 | Sharifi ................ | G10L 17/18 704/239 |
| 2016/0127361 A1* | 5/2016 | Degawa .............. | H04L 63/0861 726/3 |
| 2017/0069327 A1* | 3/2017 | Heigold ................ | G10L 17/04 |
| 2018/0018973 A1 | 1/2018 | Moreno et al. | |
| 2018/0174590 A1* | 6/2018 | Kurian ................ | G10L 17/20 |
| 2018/0196932 A1* | 7/2018 | Zhang ................. | G06F 18/22 |
| 2018/0212960 A1* | 7/2018 | Sandeep .............. | G09C 1/00 |
| 2018/0365695 A1* | 12/2018 | Liu ..................... | G06F 18/22 |
| 2019/0043508 A1* | 2/2019 | Sak ..................... | G10L 17/22 |
| 2019/0130918 A1* | 5/2019 | Wu ..................... | G10L 17/18 |

FOREIGN PATENT DOCUMENTS

| | | |
|---|---|---|
| CN | 104184587 A | 12/2014 |
| CN | 104821882 A | 8/2015 |
| EP | 3109858 A1 | 12/2016 |

OTHER PUBLICATIONS

Li et al., "Biometric Template Protection", J. Softw., vol. 20, No. 6, 2009, pp. 1553-1573.

Barni et al., "Privacy Protection in Biometric-Based Recognition Systems", IEEE Signal Processing Magazine, vol. 32, No. 5, Sep. 2015, pp. 66-76.

Zhou et al., "Feature correlation attack on biometric privacy protection schemes", Fifth International Conference on Intelligent Information Hiding and Multimedia Signal Processing, 2009, pp. 1061-1065.

Wang et al., "An analysis of random projection for changeable and privacy-preserving biometric verification", IEEE Transactions on Systems, Man, and Cybernetics, Part B (Cybernetics), vol. 40, No. 5, Oct. 2010, pp. 1280-1293.

Li et al., "Privacy protection of fingerprint database", IEEE Signal Processing Letters, vol. 18, No. 2, Feb. 2011, pp. 115-118.

Maiorana et al., "Fuzzy commitment for function based signature template protection", IEEE Signal Processing Letters, vol. 17, No. 3, Mar. 2010, pp. 249-252.

Fan et al., "Provably secure remote truly three-factor authentication scheme with privacy protection on biometrics", IEEE Transactions on Information Forensics and Security, vol. 4, No. 4, Dec. 2009, pp. 933-945.

Mathew et al., "An improved three-factor authentication scheme using smart card with biometric privacy protection", 3rd International Conference on Electronics Computer Technology, 2011, pp. 220-223.

Li et al., "Fingerprint Combination for Privacy Protection", IEEE Transactions on Information Forensics and Security, vol. 8, No. 2, Feb. 2013, pp. 350-360.

Yujin et al., "Research of speaker recognition based on combination of LPCC and MFCC", IEEE International Conference on Intelligent Computing and Intelligent Systems, 2010, pp. 765-767.

Wang et al., "A new Chinese text-to-speech system with high naturalness", Proceeding of Fourth International Conference on Spoken Language Processing. ICSLP, 1996, pp. 1441-1444.

Dehak et al., "Front end factor analysis for speaker verification", IEEE Transactions on Audio, Speech, and Language Processing, vol. 19, No. 4, May 2011, pp. 788-798.

Pathak et al., "Privacy-Preserving Speaker Authentication", Lecture Notes in Computer Science book series (LNCS, vol. 7483), 2012, pp. 1-22.

"How to protect your 'voiceprint' from identity theft", Futurity, Retrieved on Jun. 16, 2020, Webpage available at : https://www.futurity.org/how-to-protect-your-voiceprint-from-identity-theft/.

International Search Report and Written Opinion received for corresponding Patent Cooperation Treaty Application No. PCT/CN2018/073635, dated Aug. 22, 2018, 9 pages.

Office action received for corresponding Chinese Patent Application No. 201880087215.8, dated Jan. 29, 2023, 6 pages of office action and no page of translation available.

Extended European Search Report received for corresponding European Patent Application No. 18901161.2, dated Jun. 21, 2021, 9 pages.

\* cited by examiner

PRIVACY-PRESERVING VOICEPRINT AUTHENTICATION APPARATUS AND METHOD

RELATED APPLICATION

This application claims priority to PCT Application No. PCT/CN2018/073635, filed on Jan. 22, 2018, of which is incorporated herein by reference in its entirety.

TECHNICAL FIELD

Embodiments of the present disclosure relate generally to the field of authentication, more particularly, to a privacy-preserving voiceprint authentication apparatus and method.

BACKGROUND

A secure and usable authentication system has become more and more important for users to protect their digital accounts. Authentication based on biometric features is an approach with high usability. It has been widely researched and applied in academia and industry. However, the privacy of the biometric information used in authentication has not been well protected, which might greatly affect the security of the system.

There exist a series of potential risks in biometric authentication system. Privacy disclosure is one of the most serious problems. The biometric information used in the process of registration and authentication is a part of privacy information. Once the biometric privacy information is disclosed, this will result in serious consequences.

However, few existing literatures proposed effective solutions on biometric privacy preservation, especially in voiceprint based authentication.

BRIEF SUMMARY

A voiceprint authentication method, system and apparatus, as well as a computer readable medium are therefore provided.

In one example embodiment, a voiceprint authentication apparatus is described. The apparatus comprises: a voice receiving module configured to receive a user's voices in different speaking modes; a feature extraction module configured to extract respective sets of voice features from the user's voices in different speaking modes; a synthesis module configured to generate a first voiceprint template by synthesizing the respective sets of voice features; and a first communication module configured to send the first voiceprint template to a server to authenticate the user, wherein the user's voices and the respective sets of voice features are not sent to the server.

In another example embodiment, a voiceprint authentication apparatus is described. The apparatus comprises: a second communication module configured to receive a first voiceprint template from a user device of a user; and an authentication module configured to authenticate the user by comparing the first voiceprint template with a second voiceprint template pre-stored in association with the user, wherein, each of the first voiceprint template and the second voiceprint template was generated at the user device by synthesizing respective sets of voice features extracted from the user's voices in different speaking modes.

In still another example embodiment, a voiceprint authentication method is described. The method comprises: receiving a user's voices in different speaking modes; extracting respective sets of voice features from the user's voices in different speaking modes; generating a first voiceprint template by synthesizing the respective sets of voice features; and sending the first voiceprint template to a server to authenticate the user, wherein the user's voices and the respective sets of voice features are not sent to the server.

In yet another embodiment, a voiceprint authentication method is described. The method comprises: receiving a first voiceprint template from a user device of a user; and authenticating the user by comparing the first voiceprint template with a second voiceprint template pre-stored in association with the user; wherein, each of the first voiceprint template and the second voiceprint template was generated at the user device by synthesizing respective sets of voice features extracted from the user's voices in different speaking modes.

In a further example embodiment, a computer readable medium is provided. The computer readable medium is encoded with instructions that, when executed by a computer, cause performance of a method according to any embodiment of the present disclosure.

BRIEF DESCRIPTION OF THE DRAWINGS

Figure 1:
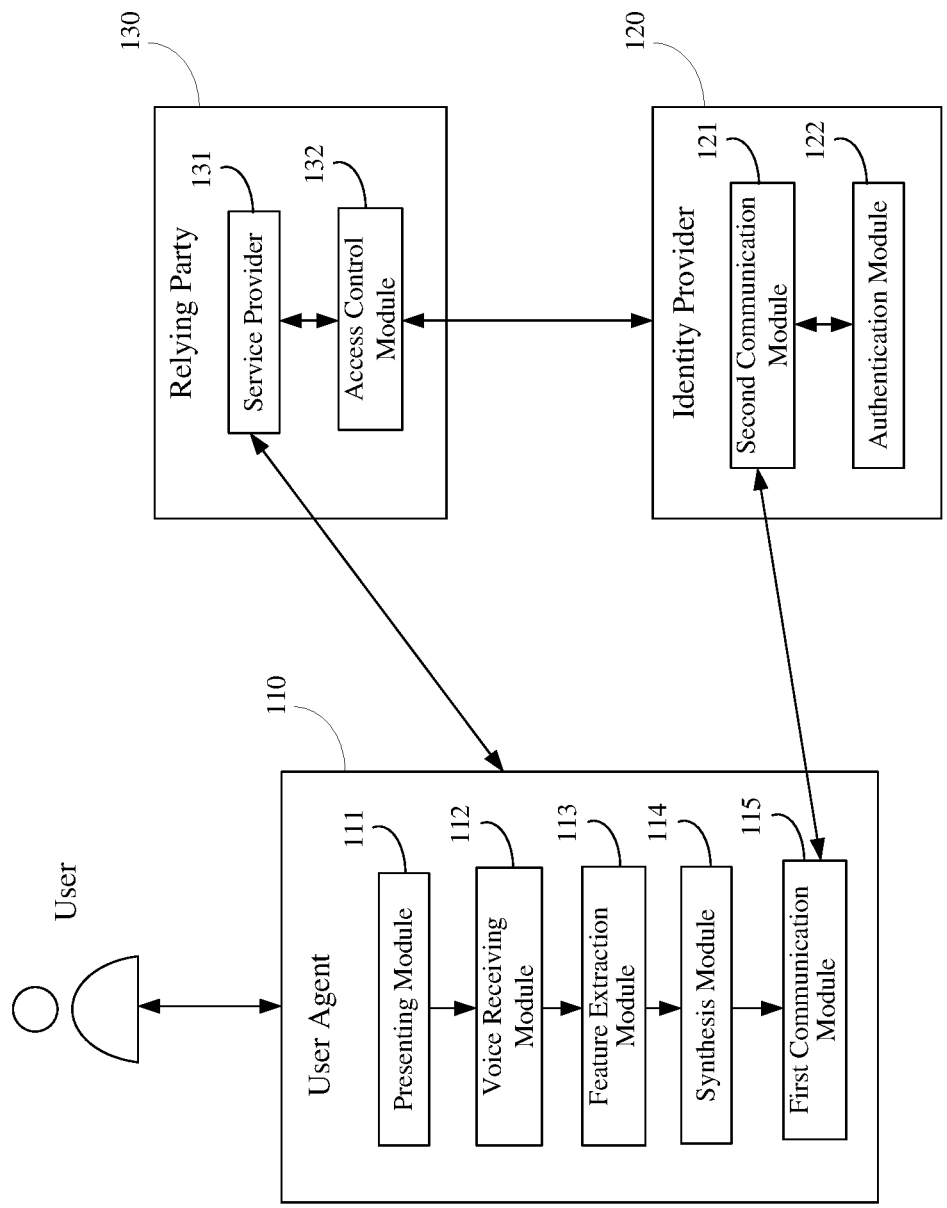
Figure 2:
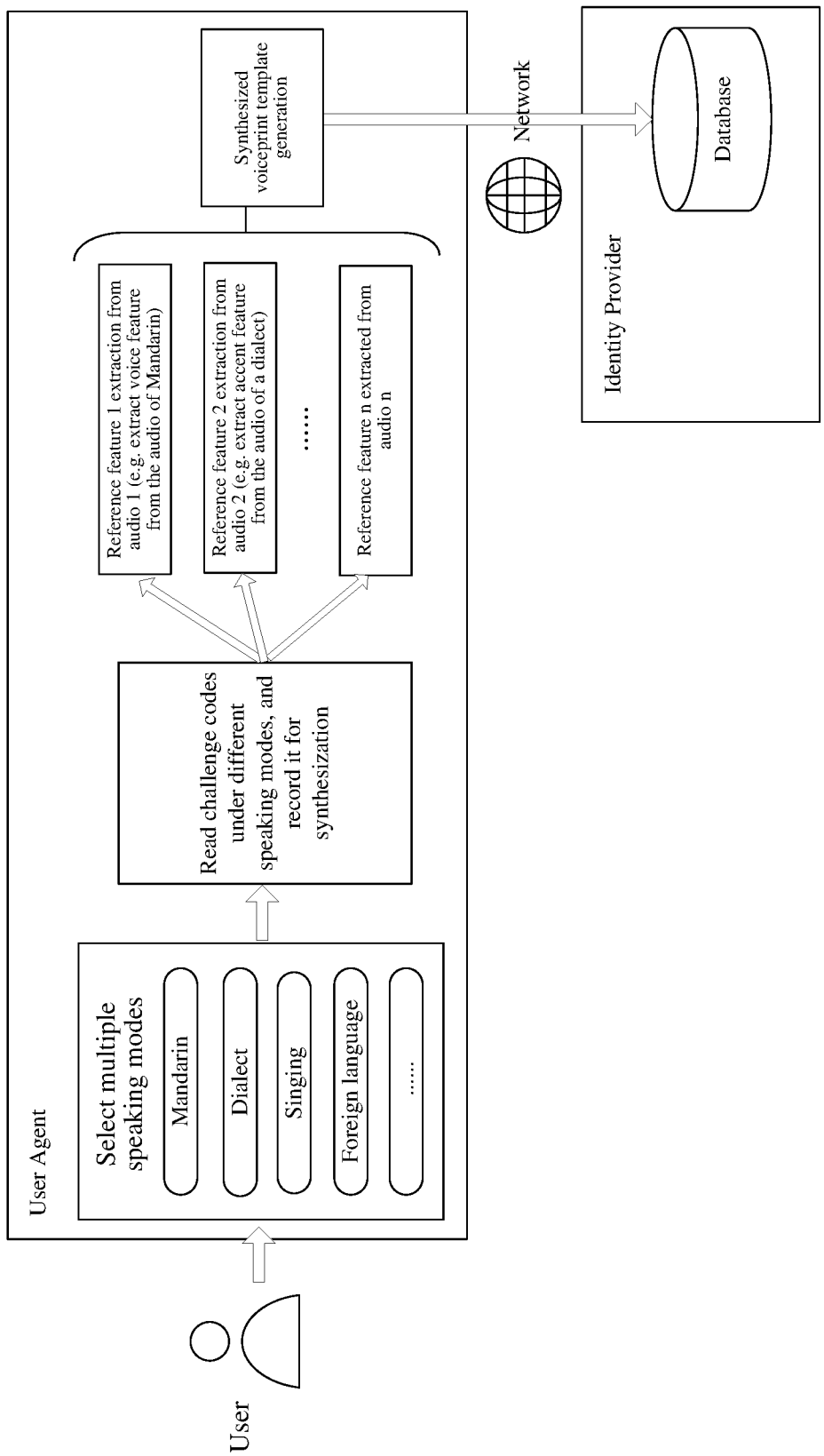
Figure 3:
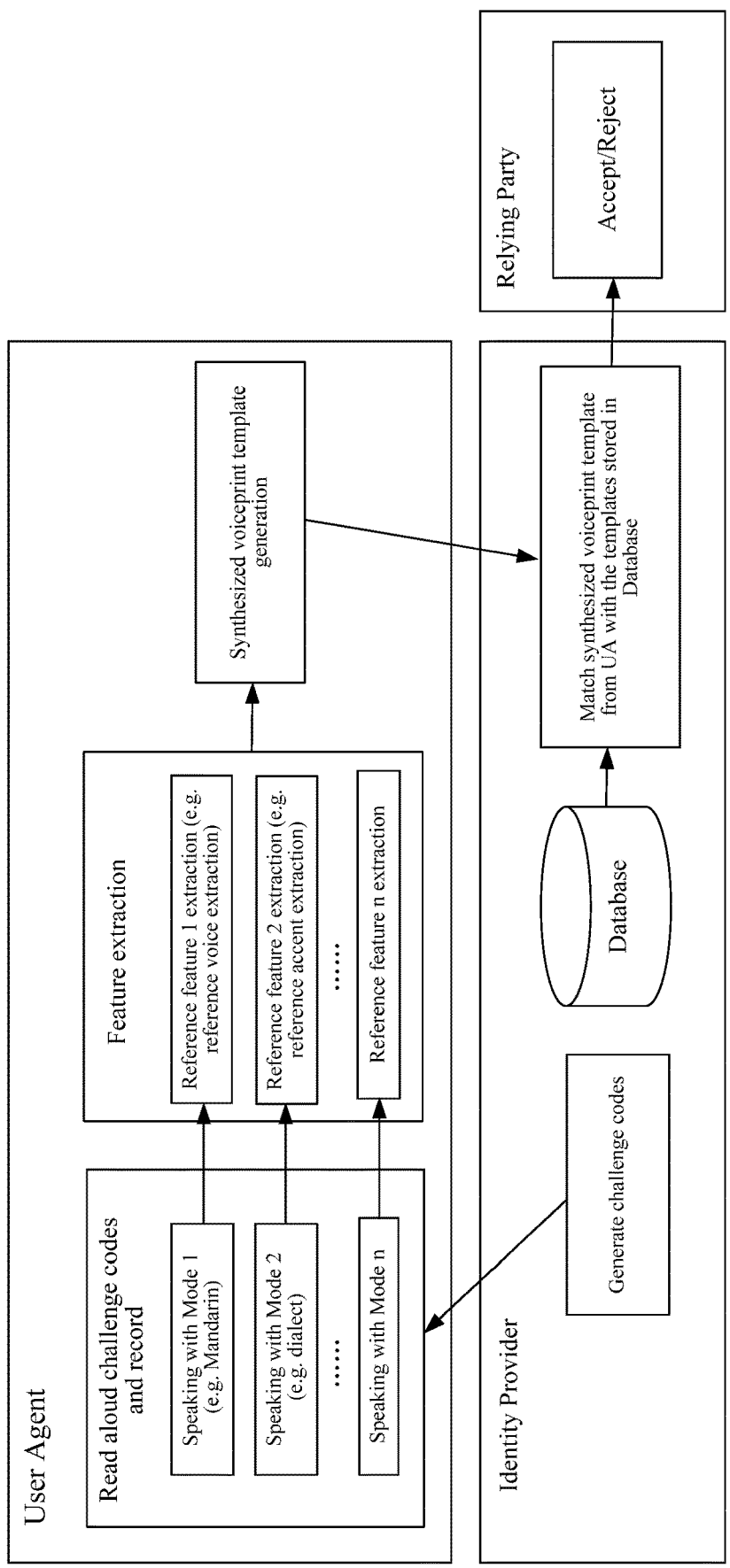
Figure 4:
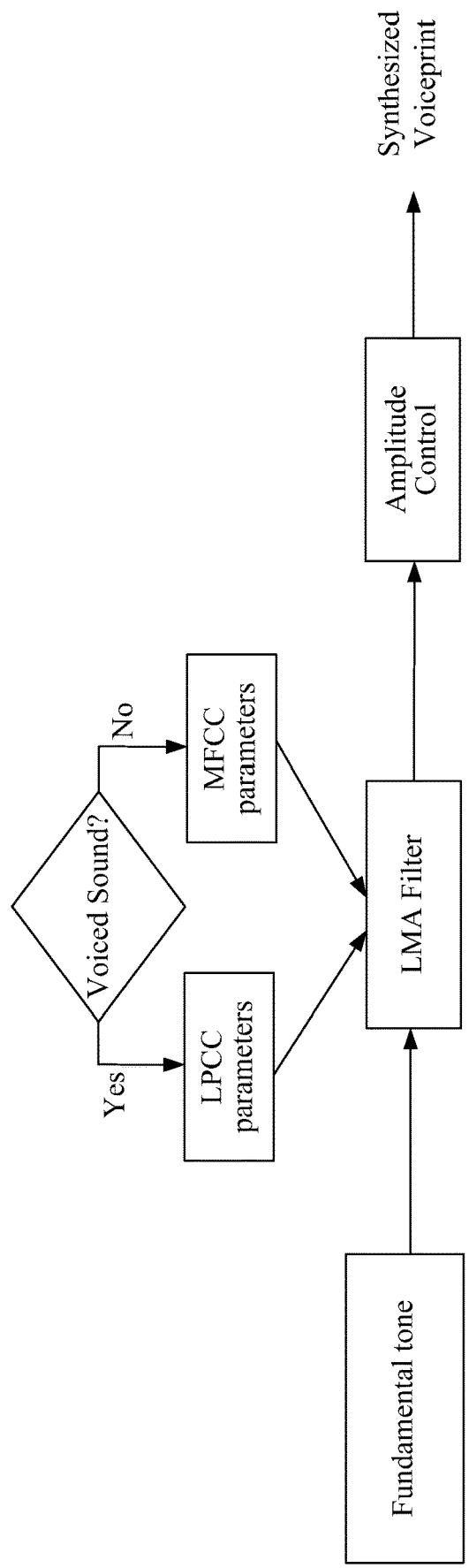
Figure 5:
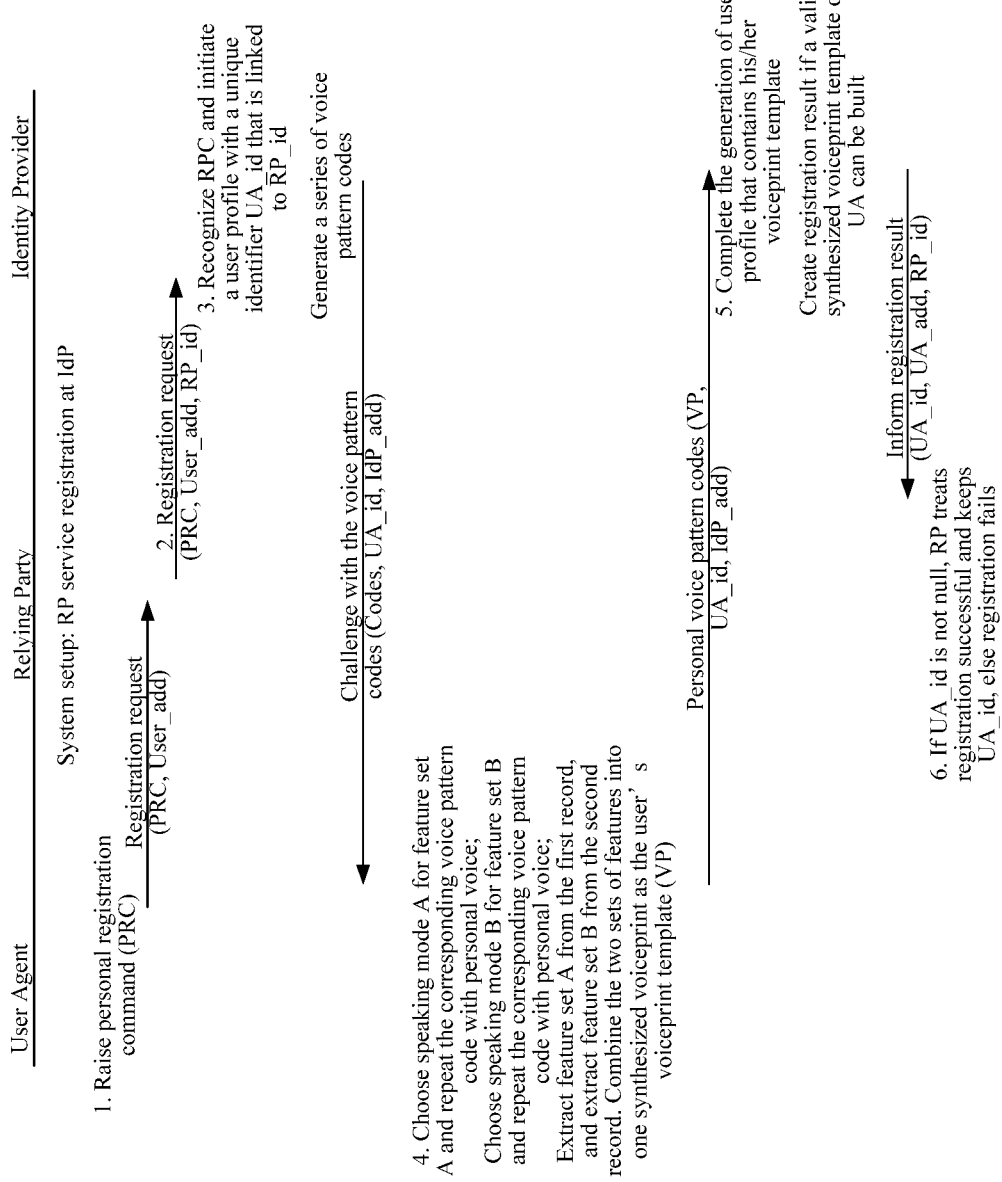

Having thus described the disclosure in general terms, reference will now be made to the accompanying drawings, which are not necessarily drawn to scale, and wherein:

FIG. 1 shows a schematic diagram of an exemplary system model according to some embodiments of the present disclosure;

FIG. 2 schematically illustrates an exemplary registration scheme according to some embodiments of the present disclosure;

FIG. 3 schematically illustrates an authentication scheme according to some embodiments of the present disclosure;

FIG. 4 schematically illustrates an exemplary process of a voiceprint template synthesis method according to some embodiments of the present disclosure;

FIG. 5 schematically illustrates an exemplary process of registration in a voiceprint authentication system with privacy preservation according to some embodiments of the present disclosure.

Figure 6:
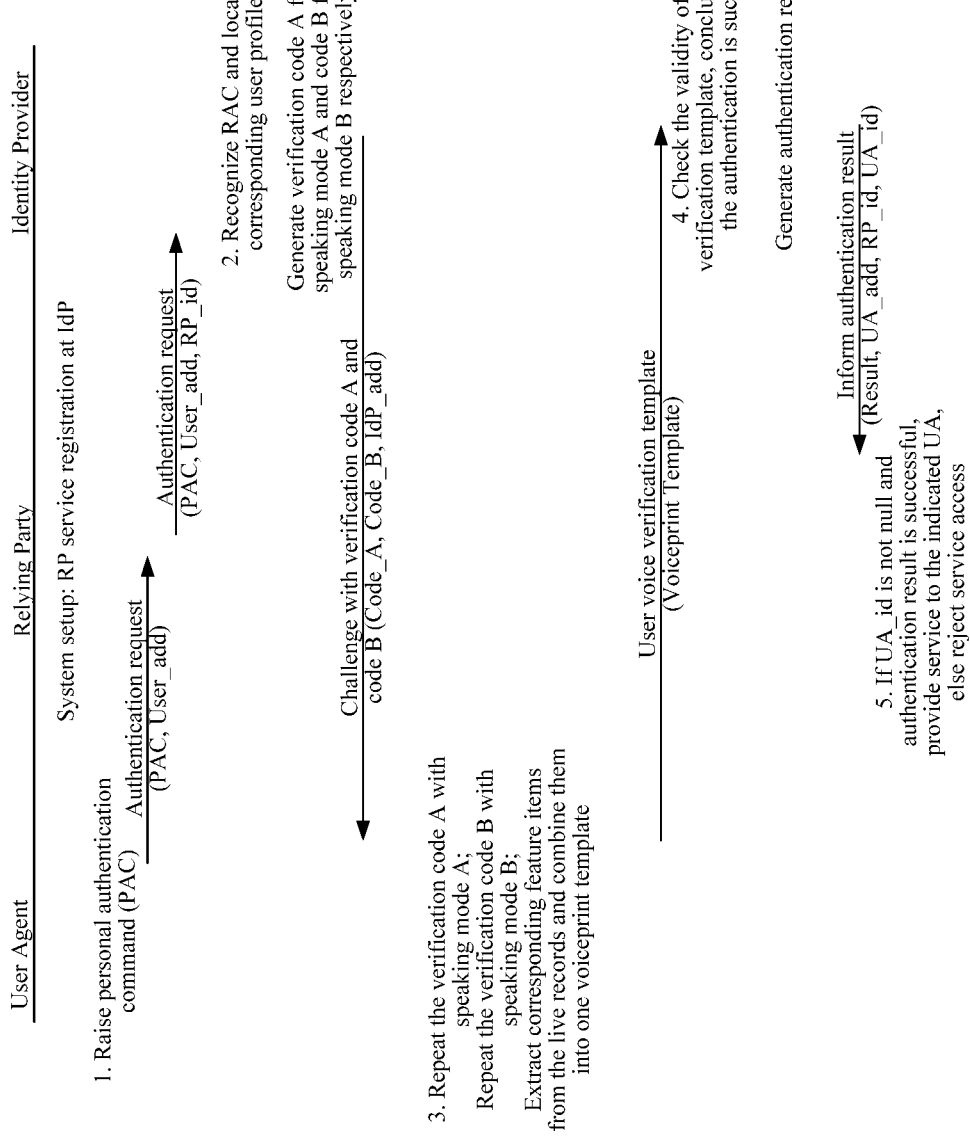

FIG. 6 schematically illustrates an exemplary process of authentication in a voiceprint authentication system with privacy preservation according to some embodiments of the present disclosure.

DETAILED DESCRIPTION

According to our investigation, we found that in almost all the existing biometric authentication systems, biometric features are typically used as a part of the authentication system to authenticate a user. However, few existing systems actually protect the biometric features themselves although they relate to user privacy. According to the current literature, privacy protection focusing on image, location information, smart meters, and Online-to-Offline (O2O) platform has been investigated. The privacy of voice in public areas still lacks consideration.

In biometric authentication systems, the collected biometric information is usually expressed as a template. Unlike an ordinary password, which can be changed at any time, the variability of the biometric template is limited due to the fact that the user's biometric features are almost static and cannot be changed. Therefore, the exposure of the template will lead to a series of security risks.

In order to enhance the security of an authentication system, we proposed a solution to protect the privacy of biometric information in the authentication system.

The present disclosure proposes a new method for protecting the privacy of voiceprint-based authentication. We found that there exists a big difference between the voice that people speak under different speaking modes (e.g., speaking in mandarin, speaking in dialect, speaking in English or other languages, singing and reading poetry). Several characteristics of people's voice will change under different speaking modes, including the tone, accent, volume and so on. So, we would like to extract the features of a user's voice in different speaking modes, and combine or integrate them into a new voiceprint template, which represents the voiceprint of the user in the process of registration and authentication.

Embodiments of the present disclosure contains the following key ideas.
a) The template of voiceprint that represents a user's identity is synthesized using the user's voices in different speaking modes;
b) The voice features required for a composite template are extracted by Linear Prediction Cepstrum Coefficient (LPCC) and Mel Frequency Ceptral Coefficient (MFCC). The former algorithm can describe the vocal characteristics of the speaker, and the latter one can describe the auditory characteristics of the human ear;
c) A synthesis algorithm based on the Log Magnitude Approximate (LMA) vocal tract model is used to combine multiple extracted voice features into a synthesized voiceprint.
d) A speaker verification algorithm based on i-vector extraction is used to match the voiceprint template generated based on challenging with the stored voiceprint template (obtained during user registration) in order to determine whether the user is eligible.
e) The system module in mobile device will only upload the synthesized template to the server. The users' original voice information will never be shared with any third parties. Thus, the user privacy in terms of voiceprint can be preserved and the user can also be authenticated based on the synthesized voiceprint template. But adversaries cannot derive the real voiceprint from the synthesized voiceprint template.

Embodiments of the present disclosure satisfies the following criteria that we proposed to evaluate the privacy preserving ability of a biometric authentication system:

Irreversibility: In order to protect private data, some algorithms might do some transformation on biometric information. These transformations must be irreversible, so that it can be ensured that when a biometric storage database is attacked, the attackers cannot restore the user's true private biometric information through the data stored in the database. The present disclosure satisfies this criterion since a user's real voiceprint cannot be figured out from the synthesized voiceprint template.

Revocability or variability: When biometric information currently used is stolen, the user should be able to withdraw previously uploaded authentication information and re-register and certify his account using new or altered biological information. Since a user's speaking modes can be many, a user can easily revoke the old synthesized voiceprint template and register a new one. Thus, this criterion can be achieved.

Unlinkability: It is good to make a user's true biological information not connected to the outside world. It is also good if a system only uses changed or indirectly generated information for authentication. In the present disclosure, a synthesized voiceprint template generated based on multiple speaking modes for authentication is used. The template does not directly contain any individual voiceprint. Because the real private voice information is not transmitted over computer networks, the chance of corresponding attacks from the network will be greatly reduced.

System Model

FIG. 1 shows an example of the system model of the present disclosure. A biometric authentication system generally includes three modules: User agent (UA) 110 that requests for an eligible identity and gets access to the Internet services or some devices; identity provider (IdP) 120 that can verify a user's identity (i.e., authenticate a user) according to received voiceprint template from the UA 110 and the voiceprint templates stored in its database; relying party (RP) 130 that can enforce access control according to the IdP's decision. Herein, the UA 110 refers to a user device such as a personal computer, mobile phone or other personal devices, or refers to a corresponding program operating on such a user device on behalf of the user. The IdP 120 and RP 130 refer to corresponding server programs or devices. In some scenarios, the RP 130 and IdP 120 may be combined into a single entity or device.

When a user raises a request of authentication via a presenting module 111 (e.g., UI) of the UA 110, the UA 110 will send an authentication request to IdP 120 through a first communication module 115 and a secure channel. After the IdP 120 receives the authentication request, it sends a challenge code (e.g., a piece of text generated randomly) to the UA 110 through a second communication module 121. Then the UA 110 may present the challenge code to the user through the presenting module 111, enabling the user to read the challenge code in multiple speaking modes. Thus, the UA may collect voice signals through a voice receiving module 112 (e.g., a microphone), and preprocess (such as noise reduction and coding) the collected voice signals. After that, a feature extraction module 113 may extract voice features from the preprocessed voice signals, a synthesis module 114 may synthesize the voice features to generate a voiceprint template, which may be sent through the first communication module 115 and the secure channel to the IdP 120 as a response to the authentication challenge. When receiving the voiceprint template, authentication module 122 of the IdP 120 may match the voiceprint template with the records in its database. Based on the matching result, the authentication module 122 of the IdP 120 can decide whether the person participating in the authentication is a legitimate user or not. Thereafter when receiving the user's access request, the RP 130 can determine the access control policy of the user through an access control module 132 according to the authentication result provided by the IdP 120, and provide a service through a service provider 131 accordingly.

Privacy Preservation

Based on our investigation, we noticed that when a person speaks in different speaking modes, his/her voices are different. For example, when someone talks in his native language, his voice is gentle. When he is not very familiar with a second language, his speaking tone might become higher, his speaking speed might slow down, meanwhile his pronunciation might not be standard.

This feature is made use of in the present disclosure. Audios from a user in different speaking modes are collected, corresponding voice feature are extracted from them, respectively, and the extracted voice features are integrated into a new voiceprint template. The synthesized voiceprint template is then used for user authentication.

FIG. 2 schematically illustrates an exemplary registration scheme according to some embodiments of the present disclosure. As shown in FIG. 2, a user agent (UA) may present to a user a challenge code and multiple speaking modes, from which the user may select multiple speaking modes that he/she wants to speak in. The challenge code may be a piece of text generated randomly by the identity provider (IdP) in response to the UA's registration request and sent to the UA. When the user speaks the challenge code in the selected speaking modes, corresponding audios are collected through the microphone embedded in the user device (i.e., UA). Then the UA extracts different voice feature items from the two or more audios and combine them into a new voiceprint template, which is then transmitted over networks to the IdP to be stored in a database thereon for later authentication. In this process, the user's original voice is only collected and processed locally. The original voice information will never be exposed to the network environment. Meanwhile, since the synthesized voiceprint template that is transmitted over the networks has already lost some original raw information, attackers cannot gain any original voice through reverse engineering. As a result, the goal of voice privacy preservation is achieved. Even when the system is under attacks and the synthesized template stored in the database may be disclosed, the user can still choose new speaking modes, generate a new synthesized voiceprint template and update registration information for later authentication.

FIG. 3 schematically illustrates an authentication scheme according to some embodiments of the present disclosure. As shown in FIG. 3, when a user needs to authenticate in the system, the UA may present to the user a challenge code and the multiple speaking modes he selected and stored in the database of the IdP in the registration process (the challenge code and the multiple speaking modes may have been sent to the UA by the IdP in response to an authentication request from the UA), enabling the user to speak the challenge code in the multiple speaking modes. Then the UA may record the user's voice in the multiple speaking modes and extract corresponding voice feature items and synthesizes them into a voiceprint template, which is then transmitted over networks to the IdP to be matched with the voiceprint template stored in the database in association with the user in the registration process in order to decide the eligibility of the user.

In the following, the exemplary algorithms that may be used in the voice authentication system for feature extraction, template synthesis and speaker verification according to embodiments of the present disclosure are briefly introduced.

The notations used in the following algorithms are listed and described in Table 1.

TABLE 1

Notations used in the algorithms

| Notation | Description |
| --- | --- |
| $x(n)$ | The frame of audio data. |
| $a_1, a_2, \ldots, a_M$ | The M-order Linear Prediction Coefficient (LPC) feature vector. |
| $c_1, c_2, \ldots, c_M$ | The first M values of the linear prediction cepstrum. |
| $X(n)$ | The linear spectrum of $x(n)$ (result of Discrete Fourier Transformation (DFT)). |
| $N$ | The maximum length of $x(n)$. |
| $H_m(n)$ | The frequency response of Mel-frequency filter. |
| $f(m)$ | The central frequency of Mel-frequency filter. |
| $M$ | The quantity of triangle filters (i.e. Mel-frequency filter). |
| $F_S$ | Sampling frequency. |
| $B^{-1}(b)$ | $B^{-1}(b) = 700 \, (e^{b/1125} - 1)$ |
| $L(m)$ | The logarithmic energy that each filter group outputs. |
| $D(n)$ | The Mel Frequency Cepstrum Coefficient (MFCC). |
| $H_L(n)$ | The frequency response of Log Magnitude Approximate (LMA) filter. |
| $c_m$ | The extracted cepstrum coefficient of voice signals. |
| $\omega$ | I-vector, i.e., a feature vector that can be used to represent a given voiceprint. |
| $N_c$ | The one of formulas used to gain Baum-Welch statistics. |
| $F_c$ | The other one of formulas used to gain Baum-Welch statistics. |
| $c$ | The Gaussian index. |
| $\Omega$ | The Universal Background Model (UBM) $\Omega$ composed of C mixture components defined in some feature space of dimension F. |
| $P(c \mid x_t, \Omega)$ | The posterior probability of mixture component c to generate vector $x_t$. |
| $\tilde{F}_c$ | The centralized first-order Baum-Welch statistics. |
| $m_c$ | The mean of UBM mixture component c. |
| $T$ | The total variability matrix. |
| $N(u)$ | The diagonal matrix of dimension CF × CF whose diagonal blocks are $N_c I$ (c = 1, ..., C). |
| $\tilde{F}(u)$ | The supervector of dimension CF × 1 obtained by concatenating all first-order Baum-Welch statistics $\tilde{F}_c$ for a given voiceprint u. |

LPCC and MFCC for Feature Extraction

Linear Prediction Cepstrum Coefficient (LPCC) and Mel Frequency Cepstrum Coefficient (MFCC) are usually used to extract features for text-independent speaker recognition. Yuan et. al. (see Y. Yuan, P. Zhao, and Q. Zhou, "Research of speaker recognition based on combination of LPCC and MFCC," IEEE International Conference on Intelligent Computing and Intelligent Systems, vol. 3, pp. 765-767, 2010, the entirety of which in incorporated herein by reference)

did an experiment and proved that the combination of LPCC and MFCC has a higher recognition rate.

In order to calculate LPCC and MFCC parameters, the first thing that needs to be done is preprocessing the audio data. There are three main steps in the preprocessing procedure, including pre-emphasizing, framing and windowing, which are known in the art and will not be described herein.

Then each frame x(n) is used as an input to complete the calculation for feature extraction.

LPCC is a recursion from LPC parameter. The recursion formula is as follows:

$$\begin{cases} c_1 = a_1 \\ c_n = a_n + \sum_{k=1}^{n-1} \frac{k}{n} c_k a_{n-k}, & 1 < n \leq M \\ c_n = \sum_{k=1}^{n-1} \frac{k}{n} c_k a_{n-k}, & n > M \end{cases} \quad (1)$$

In this formula, $a_1, a_2, \ldots, a_M$ are the M-order Linear Prediction Coefficient (LPC) feature vector, which be obtained from the series of frames of audio data x(n) using a linear prediction algorithm know in the art, such as the Levinson-Durbin algorithm.

MFCC calculating flow after preprocessing is as follows:

1) Process x(n) through Discrete Fourier Transformation (DFT) to gain linear spectrum, the transformation formula is as follows:

$$X(k) = \sum_{n=0}^{N-1} x(n) e^{-j2\pi nk/N} (0 \leq n, k \leq N-1) \quad (2)$$

2) M triangle filters $H_m(n)$ (i.e. Mel-frequency filter) are defined as follows:

$$\begin{cases} H_m(k) = 0 & (k < f(m-1)) \\ \frac{k - f(m-1)}{f(m) - f(m-1)} & (f(m-1) \leq k < f(m)) \\ \frac{f(m+1) - k}{f(m+1) - f(m)} & (f(m) \leq k < f(m+1)) \\ 0 & (k > f(m+1)) \end{cases} \quad (3)$$

where m=1, . . . , M.
The central frequency of Mel-filter is defined as follows:

$$f(m) = \frac{N}{F_s} B^{-1}\left(B(f_1) + m \frac{B(f_h) - B(f_1)}{M+1}\right) \quad (4)$$

3) The logarithmic energy that each filter group output is:

$$L(m) = \ln(\sum_{k=0}^{N-1} |X(k)|^2 H_m(k)) \quad (5)$$

4) Calculate the discrete cosine transform (DCT) of L(m) to gain $D_m$, where m=1, . . . , M. $D=(D_1, D_2, \ldots, D_k)$ is the MFCC parameter.

$$D(n) = \sum_{m=0}^{M-1} L(m) \cos\left(\frac{\pi n \left(m + \frac{1}{2}\right)}{M}\right) \quad (6)$$

Voice Synthesis Based on LMA Vocal Tract Model

Wang et. al. (see Wang R H, Liu Q, Tang D, "A new Chinese text-to-speech system with high naturalness", International Conference on Spoken Language, 1996. Icslp 96, vol. 3, pp. 1441-1444, the entirety of which in incorporated herein by reference) proposed a voice synthesis algorithm based on Log Magnitude Approximate (LMA) filter, which can generate high quality voice with a small set of parameters. Referring to this algorithm, a voiceprint template synthesis method according to embodiments of the present disclosure is proposed as follows:

The frequency response of LMA filter $H_L(n)$ is:

$$H_L(n) = \exp(\sum_{m=0}^{M} c_m n^{-m}) \quad (7)$$

where $c_m$ is the cepstrum coefficient of the voice signals.

FIG. 4 schematically illustrates an exemplary process of a voiceprint template synthesis method according to some embodiments of the present disclosure.

As shown in FIG. 4, first, fundamental tone corresponding to the user's voices is constructed. Herein, the fundamental tone actually refers to the glottal excitation source wave artificially constructed from the standard syllables without personal characteristics from a phoneme database corresponding to the respective syllables in the user's voices. Then, the fundamental tone is analyzed to determine the voiced sound and unvoiced sound therein, for example, based on parameters such as short term energy, zero-crossing or auto-correlation function, as is known in the art. For the voiced sound in the fundamental tone, the LPCC parameters obtained in formula (1) is used to substitute the $c_m$ in formula (7); and for the unvoiced sound in the fundamental tone, the MFCC parameters obtained by formula (6) may be used to substitute the $c_m$ in formula (7), and then after amplitude control, a synthesized voiceprint is obtained. The synthesized voiceprint may be sent to a server such as an IdP as a voiceprint template to be used for authentication of the user at a later time. Alternatively, the i-vector calculated from the synthesized voiceprint as described below may be instead sent to the server as a voiceprint template to be used for authentication of the user at a later time.

I-Vector for Speaker Verification

The i-vector ω is a hidden variable, which can be defined by its posterior distribution conditioned to the Baum-Welch statistics for a given utterance.

1) With a sequence of L frames {x1, x2, . . . , $x_L$}, which herein are frames from the synthesized voiceprint obtained in the above process shown in FIG. 4, suppose we have an universal background model (UBM) Ω composed of C mixture components defined in some feature space of dimension F. Herein, Ω is a UBM trained based on Gaussian Mixed Model (GMM) using a lot of speech data. It is a M order vector, M being a parameter configurable as needed, and represents the most universal and common speech features. In order to estimate the i-vector of a given voiceprint, the Baum-Welch statistics are needed. The calculation formula is as below:

$$N_c = \sum_{t=1}^{L} P(c|x_t, \Omega) \quad (8)$$

$$F_c = \sum_{t=1}^{L} P(c|x_t, \Omega) x_t \quad (9)$$

2) In order to estimate the i-vector, it is also needed to compute the centralized first-order Baum-Welch statistics based on the universal background model (UBM) mean mixture components.

$$\tilde{F}_c = \sum_{t=1}^{L} P(c|x_t, \Omega)(y_t - m_c) \quad (10)$$

3) The i-vector for a given voiceprint can be calculated according to the following formula:

$$\omega = (I + T^t \Sigma^{-1} N(u) T)^{-1} T^t \Sigma^{-1} \tilde{F}(u) \quad (11)$$

When deciding whether the user is eligible, a value of the cosine similarity between the target speaker i-vector $\omega_{target}$ (i.e., the template stored ahead of time in IdP during user registration) and the test i-vector $\omega_{test}$ (i.e., the template collected during user authentication) may be calculated as a decision score:

$$\text{score}(\omega_{target}, \omega_{test}) = \frac{\langle \omega_{target}, \omega_{test} \rangle}{\|\omega_{target}\| \|\omega_{test}\|} \qquad (12)$$

wherein, $\langle \omega_{target}, \omega_{test} \rangle$ denotes the dot product of $\omega_{target}$ and $\omega_{test}$, and $\|\omega_{target}\| \|\omega_{test}\|$ denotes the Euclidian distance between $\omega_{target}$ and $\omega_{test}$.

The value of this score is then compared to a threshold θ in order to make a decision. If the score is less than the threshold value, the match fails and the user is ineligible. Otherwise if the score is great than or equal to the threshold value, the match is successful and the user is treated eligible.

Process of Registration

FIG. 5 schematically illustrates an exemplary process of registration in a voiceprint authentication system with privacy preservation according to some embodiments of the present disclosure. As shown in FIG. 5, the process includes the following steps:

1. If a user wants to access RP, he/she raises a Personal Registration Command (RPC) and sends a registration request including the RPC and the UA address (UA_add) to RP;
2. When RP receives the registration request, it packages the request with its own id (RP_id) and sends the request to the IdP;
3. When IdP receives the registration request, it initiates a user profile with a unique identifier (UA_id) that is linked to the RP's id. Then IdP generates a series of voice pattern codes for the corresponding speaking modes for the user to choose, and send the voice pattern codes to UA;
4. According to the options showed by a user interface, the user may choose two or more speaking modes to read the pattern codes. UA will extract different feature items from different audio records. For example, the mode A selected by the user is speaking in mandarin, and UA will extract the feature of tone from record A. The mode B selected by the user is speaking in a dialect, and UA will extract the feature of pronunciation from record B. Then UA can combine those two features and generate a new voiceprint template using a synthesis algorithm based on the Log Magnitude Approximate (LMA) vocal tract model, which will represent the user's voiceprint (VP) and be sent to the IdP server. Herein, the voiceprint template may be either the synthesized voiceprint generated in the above process shown in FIG. 4, or the i-vector generated from the synthesized voiceprint in formula (11).
5. When IdP receives the voiceprint template, it may complete the generation of the user profile. Then it may create a registration result, and send the result to RP together with UA_id.
6. If UA_id is not null, RP treats the registration successful and keeps UA_id. Otherwise the registration fails.

Process of Authentication

FIG. 6 schematically illustrates an exemplary process of authentication in a voiceprint authentication system with privacy preservation according to some embodiments of the present disclosure. As shown in FIG. 6, the process includes the following steps:

1. If a user wants to access a registered RP, he/she should prove his/her eligibility. In this case, UA may raise a Personal Authentication Command (PAC), and send an authentication request including the PAC and the UA address (UA_add) to RP. RP may forward the request to IdP together with RP_id.
2. When IdP receives and recognizes the authentication request, it may locate the corresponding user profile, e.g., using the UA_add.

According to the two or more speaking modes that the user selected during registration, IdP may generate a number of challenge codes, and send the codes to UA.

3. The user may repeat those challenge codes in corresponding speaking modes respectively and record them with UA. UA then may extract a set of feature items from each records. The feature item extracted from one record is different from the other. Then UA may combine all extracted features to generate a response voiceprint template and send the template to IdP.
4. IdP may check whether the response voiceprint template can match the voiceprint template stored in the database or not, using a speaker verification algorithm based on i-vector extraction. Cosine distance scoring based on i-vectors indicates the matching result. Then an authentication result is generated according to the matching result. IdP may send the result and other essential information to RP.
5. If the authentication result indicates that the user's voice is eligible, RP may allow service access to the user; otherwise RP may reject service access.

Voiceprint Authentication Method According to Some Embodiments

From the above description, it can be seen that in an aspect of the present disclosure, there is provided a voiceprint authentication method. In some embodiments, the method comprises the following steps:

receiving a user's voices in different speaking modes;
extracting respective sets of voice features from the user's voices in different speaking modes;
generating a first voiceprint template by synthesizing the respective sets of voice features; and
sending the first voiceprint template to a server to authenticate the user, wherein the user's voices and the respective sets of voice features are not sent to the server.

In some further embodiments, extracting respective sets of voice features from the user's voices in different speaking modes comprises:

extracting a first set of features from the user's voice in a first speaking mode using a Linear Prediction Cepstrum Coefficient (LPCC) algorithm; and
extracting a second set of features from the user's voice in a second speaking mode using a Mel Frequency Cepstral Coefficient (MFCC) algorithm.

In some further embodiments, synthesizing the respective sets of voice features comprises:

synthesizing the respective sets of voice features using a voice synthesis algorithm based on Log Magnitude Approximate (LMA) vocal tract model, so as to obtain a synthesized voiceprint.

In some further embodiments, synthesizing the respective sets of voice features using a voice synthesis algorithm based on Log Magnitude Approximate (LMA) vocal tract model so as to obtain a synthesized voiceprint comprises:

for a fundamental tone signal corresponding to the user's voices, using LMA filters with LPCC parameters to process the voiced sound therein, and using LMA filters with MFCC parameters to process the unvoiced sound therein, so as to obtain a synthesized voiceprint.

In some further embodiments, generating a first voiceprint template by synthesizing the respective sets of voice features further comprises:

extracting an i-vector from the synthesized voiceprint, as the first voiceprint template.

In some other embodiments, the synthesized voiceprint is sent to the server as the voiceprint template.

In some further embodiments, the method further comprises:

sending an authentication request to the server;

receiving different speaking modes preselected and stored in association with the user and a first challenge code from the server; and presenting the different speaking modes and the first challenge code to the user enabling the user to read the first challenge code in the different speaking modes respectively to produce the user's voices in the different speaking modes.

In some further embodiments, the method further comprises:

in a registration process, presenting a second challenge code and a user interface enabling the user to select different speaking modes respectively, and to read the second challenge code in the selected different speaking modes respectively to produce the user's voices in the selected different speaking modes;

receiving the user's voices in the selected different speaking modes;

extracting respective sets of voice features from the user's voices in the selected different speaking modes;

generating a second voiceprint template by synthesizing the respective sets of voice features; and sending the second voiceprint template to the server to be stored in association with the user, wherein the user's voices and the respective sets of voice features are not sent to the server.

In some further embodiments, the different speaking modes comprise any two or more of speaking in different languages, speaking in different dialects, singing and reading poetry.

Voiceprint Authentication Method According to Some Other Embodiments

In another aspect of the present disclosure, there is provided a voiceprint authentication method. In some embodiments, the method comprises the following steps:

receiving a first voiceprint template from a user device of a user; and authenticating the user by comparing the first voiceprint template with a second voiceprint template pre-stored in association with the user;

wherein, each of the first voiceprint template and the second voiceprint template was generated at the user device by synthesizing respective sets of voice features extracted from the user's voices in different speaking modes.

In some further embodiments, authenticating the user by comparing the first voiceprint template with a second voiceprint template pre-stored in association with the user comprises:

calculating a cosine similarity between the first voiceprint template and the second voiceprint template, the first voiceprint template and the second voiceprint template being in the form of vectors;

determining whether the cosine similarity calculated is greater than or equal to a threshold;

when the cosine similarity calculated is greater than or equal to the threshold, determining that the authentication succeeds; and otherwise, determining that the authentication fails.

While steps of a voiceprint authentication method according to some embodiments of the present disclosure has been described, it will be noted that the above description are only exemplary illustration, rather than limitation to the present disclosure. In other embodiments of the present disclosure, the method may include more, less or different steps than those described, and the relationships of order, inclusion, function etc. among those steps may be different from those described and illustrated.

Voiceprint Authentication Apparatus According to Some Embodiments

In a further aspect of the present disclosure, there is provided a voiceprint authentication apparatus. In some embodiments, the voiceprint authentication apparatus may be the user agent 110 shown in FIG. 1. As such, the voiceprint authentication apparatus comprises the following modules:

a voice receiving module 112 configured to receive a user's voices in different speaking modes;

a feature extraction module 113 configured to extract respective sets of voice features from the user's voices in different speaking modes;

a synthesis module 114 configured to generate a first voiceprint template by synthesizing the respective sets of voice features; and a first communication module 115 configured to send the first voiceprint template to a server to authenticate the user, wherein the user's voices and the respective sets of voice features are not sent to the server.

In some further embodiments, the feature extraction module 113 is further configured to:

extract a first set of features from the user's voice in a first speaking mode using a Linear Prediction Cepstrum Coefficient (LPCC) algorithm; and extract a second set of features from the user's voice in a second speaking mode using a Mel Frequency Cepstral Coefficient (MFCC) algorithm.

In some further embodiments, the synthesis module 114 is further configured to:

synthesize the respective sets of voice features using a voice synthesis algorithm based on Log Magnitude Approximate (LMA) vocal tract model, so as to obtain a synthesized voiceprint.

In some further embodiments, the synthesis module 114 is further configured to:

for a fundamental tone signal corresponding to the user's voices, use LMA filters with LPCC parameters to process the voiced sound therein, and use LMA filters with MFCC parameters to process the unvoiced sound therein, so as to obtain a synthesized voiceprint.

In some further embodiments, the synthesis module 114 is further configured to: extract an i-vector from the synthesized voiceprint, as the first voiceprint template.

In some other embodiments, the first communication module 115 is further configured to send the synthesized voiceprint to the server as the first voiceprint template.

In some further embodiments, the first communication module 115 is further configured to:

send an authentication request to the server;

receive different speaking modes preselected and stored in association with the user and a first challenge code from the server;

and the apparatus further comprises:
a presenting module 111 configured to present the first challenge code to the user enabling the user to read the first challenge code in the different speaking modes to produce the user's voices in the different speaking modes.

In some further embodiments, in a registration process,
the presenting module 111 is further configured to present a second challenge code and a user interface enabling the user to select different speaking modes respectively, and to read the second challenge code in the selected different speaking modes respectively to produce the user's voices in the selected different speaking modes;
the voice receiving module 112 is further configured to receive the user's voices in the selected different speaking modes;
the feature extraction module 113 is further configured to extract respective sets of voice features from the user's voices in the selected different speaking modes;
the synthesis module 114 is further configured to generate a second voiceprint template by synthesizing the respective sets of voice features; and
the communication module 115 is further configured to send the second voiceprint template to the server to be stored in association with the user, wherein the user's voices and the respective sets of voice features are not sent to the server.

In some further embodiments, the different speaking modes comprises any two or more of speaking in different languages, speaking in different dialects, singing and reading poetry.

Voiceprint Authentication Apparatus According to Some Other Embodiments

In still another aspect of the present disclosure, there is provided a voiceprint authentication apparatus. In some embodiments, the voiceprint authentication apparatus may be the identity provider 120 as shown in FIG. 1. As such, the voiceprint authentication apparatus may comprise the following modules:
a second communication module 121 configured to receive a first voiceprint template from a user device of a user; and
an authentication module 122 configured to authenticate the user by comparing the first voiceprint template with a second voiceprint template pre-stored in association with the user,
wherein, each of the first voiceprint template and the second voiceprint template was generated at the user device by synthesizing respective sets of voice features extracted from the user's voices in different speaking modes.

In some further embodiments, the authentication module 122 is further configured to:
calculate a cosine similarity between the first voiceprint template and the second voiceprint template, the first voiceprint template and the second voiceprint template being in the form of vectors;
determine whether the cosine similarity calculated is greater than or equal to a threshold;
when the cosine similarity calculated is greater than or equal to the threshold, determine that the authentication succeeds; and
otherwise, determine that the authentication fails.

While modules of a voiceprint authentication apparatus according to some embodiments of the present disclosure has been described, it will be noted that the above description are only exemplary illustration, rather than limitation to the present disclosure. In other embodiments of the present disclosure, the apparatus may include more, less or different modules than those described, and the relationships of connection, inclusion, function etc. among those modules may be different from those described.

Computer Readable Medium According to Some Embodiments

In yet another aspect of the present disclosure, there is provided a computer readable medium. In some embodiments, the computer readable medium is encoded with instructions that, when executed by a computer, cause performance of a method according to any embodiment of the present disclosure.

Advantages of Embodiments of the Present Disclosure

1. Privacy: The privacy of users' voice information is preserved since the present disclosure satisfies the evaluation criteria. User's original voice is never accessed by a third party in a networking environment. The solution of the present disclosure satisfies unlinkability and can prevent eavesdropping attacks. In addition, the synthesized voiceprint template cannot be reversed to obtain the original voice records since the synthesized template only contains partial information of the original audio, which satisfies irreversibility. When an attack happens or the old template saved in the IdP is expired, the user can select new speaking modes to update his registration information, which satisfied the criteria of revocability.

2. High-efficiency: The algorithms used in the present disclosure are all mature and have been widely used. They cost little operation time and computational resources. They are suitable for mobile devices.

3. Easy to implement and expand: The present disclosure does not change the original structure of the authentication system. It only changes some module and running procedure with different algorithms. The independence among each module is obvious. So the present disclosure can be easily implemented and enhanced. The present disclosure does not need new types of data, neither does it need extra equipment.

It will be further understood that each block of the flowchart, and combinations of blocks in the flowcharts may be implemented by various means, such as hardware, firmware, processor, circuitry, and/or other devices associated with execution of software including one or more computer program instructions. For example, one or more of the steps of the method above may be embodied by computer program instructions. In this regard, the computer program instructions which embody the steps described above may be stored by a memory device of an apparatus according to an example embodiment of the present disclosure as described hereinafter and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In an example embodiment, certain ones of the operations above may be modified or further amplified. Furthermore, in an example embodiment, additional optional operations may be included. Modifications, additions, or amplifications to the operations above may be performed in any order and in any combination.

It will be further understood that the voiceprint authentication apparatus according to embodiments of the present disclosure may further comprise at least one processor, at least one memory including computer program code; the at least one memory and the computer program code configured to, with the at least one processor, cause the apparatus to execute steps of the voiceprint authentication method according to embodiments of the present disclosure, or form at least some modules of the apparatus according to embodiments of the present disclosure.

In some exemplary embodiments, the processor (and/or co-processors or any other processing circuitry assisting or otherwise associated with the processor) may be in communication with the memory via a bus for passing information among components of the apparatus. The memory may include, for example, one or more volatile and/or non-volatile memories. In other words, for example, the memory may be an electronic storage device (for example, a computer readable storage medium) comprising gates configured to store data (for example, bits) that may be retrievable by a machine (for example, a computing device like the processor). The memory may be configured to store information, data, applications, instructions, or the like for enabling the apparatus to carry out various functions in accordance with an example embodiment of the present disclosure. For example, the memory could be configured to buffer input data for processing by the processor. Additionally or alternatively, the memory device could be configured to store instructions for execution by the processor.

The apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment of the present disclosure on a single chip or as a single "system on a chip." As such, in some cases, a chip or chipset may constitute means for performing one or more operations for providing the functionalities described herein.

The processor may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in an example embodiment, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor may be configured to execute instructions stored in the memory or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an example embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or network entity) configured to employ an example embodiment of the present disclosure by further configuration of the processor by instructions for performing the algorithms and/or operations described herein. The processor may include, among other things, a clock, an arithmetic logic unit (ALU) and logic gates configured to support operation of the processor.

In some embodiments, the voiceprint authentication apparatus may further comprise a communication interface, which may be, comprise or be associated with the first communication module or the second communication module described above. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a network interface card, a communication modem and/or other hardware/software for supporting communication via optical fiber, cable, digital subscriber line (DSL), universal serial bus (USB) or other mechanisms.

In an example embodiment, the voiceprint authentication apparatus may include a user interface that may, in turn, be in communication with the processor to receive an indication of, or relating to, a user input and/or to cause provision of an audible, visual, mechanical or other output to the user. As such, the user interface may include, for example, a keyboard, a mouse, a joystick, a display, a touch screen(s), touch areas, soft keys, a microphone, a speaker, or other input/output mechanisms.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Many modifications and other embodiments of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus, comprising:
    at least one hardware processing core,
    at least one non-transitory memory including computer program code,
    the at least one non-transitory memory and the computer program code being configured to, with the at least one hardware processing core, cause the apparatus at least to,
    receive a user's voices in different speaking modes;
    extract respective sets of voice features from the user's voices in the different speaking modes comprising to extract a first set of features of the sets of voice features from the user's voices in a first speaking mode based on a first algorithm, and to extract a second set of features of the sets of voice features from the user's voices in a second algorithm, where the first and second algorithms are different;
    generate a first voiceprint template derived from the sets of voice features by synthesizing the respective sets of the voice features; and
    send the first voiceprint template to a server to authenticate the user, wherein the user's voices and the respective sets of the voice features are not sent to the server.

2. The apparatus of claim 1, wherein the
    first algorithm comprises a linear prediction cepstrum coefficient algorithm; and
    the second algorithm comprises a mel frequency cepstral coefficient algorithm.

3. The apparatus of claim 1, wherein the apparatus is further configured to:
    synthesize the respective sets of the voice features with a voice synthesis algorithm based on a log magnitude approximate vocal tract model, to obtain a synthesized voiceprint.

4. The apparatus of claim 3, wherein the apparatus is further configured to:
    for a fundamental tone signal corresponding to the user's voices, use log magnitude approximate filters with linear prediction cepstrum coefficient parameters to process voiced sound therein, and use the log magnitude approximate filters with mel frequency cepstral coefficient parameters to process unvoiced sound therein, so as to obtain the synthesized voiceprint.

5. The apparatus of claim 3, wherein the apparatus is further configured to:
    extract a vector from the synthesized voiceprint, as the first voiceprint template.

6. The apparatus of claim 3, wherein the apparatus is further configured to send the synthesized voiceprint to the server as the first voiceprint template.

7. The apparatus of claim 1, wherein the apparatus is further configured to:
  send an authentication request to the server;
  receive different speaking modes preselected and stored in association with the user and a first challenge code from the server;
  present the first challenge code to the user enabling the user to read the first challenge code in the different speaking modes.

8. The apparatus of claim 7, wherein the apparatus is further configured to:
  present a second challenge code and a user interface enabling the user to select different speaking modes respectively;
  receive the user's voices in the selected different speaking modes;
  extract respective sets of the voice features from the user's voices in the selected different speaking modes;
  generate a second voiceprint template by synthesizing the respective sets of the voice features; and send the second voiceprint template to the server to be stored in association with the user, wherein the
  user's voices and the respective sets of the voice features are not sent to the server.

9. The apparatus of claim 1, wherein the different speaking modes comprises any two or more of speaking in different languages, speaking in different dialects, singing and reading poetry.

10. A voiceprint authentication apparatus, comprising:
  at least one hardware processing core,
  at least one non-transitory memory including computer program code,
  the at least one non-transitory memory and the computer program code being configured to, with the at least one hardware processing core, cause the apparatus at least to,
  receive a first voiceprint template from a user device of a user, wherein the first voiceprint template is derived from synthesized sets of voice features of the user extracted from the user's voices in different speaking modes, said extraction further comprising to extract a first set of features of the sets of voice features from the user's voices in a first speaking mode based on a first algorithm, and to extract a second set of features of the sets of voice features from the user's voices in a second algorithm, where the first and second algorithms are different; and
  authenticate the user by comparing the first voiceprint template with a second voiceprint template prestored in association with the user, wherein the second voiceprint template comprises second synthesized, respective sets of voice features previously extracted from voices of the user in the different speaking modes.

11. The apparatus of claim 10, wherein the apparatus is further configured to:
  calculate a cosine similarity between the first voiceprint template and the second voiceprint template, the first voiceprint template and the second voiceprint template being in a form of vectors;
  determine whether the cosine similarity calculated is greater than or equal to a threshold;
  when the cosine similarity calculated is greater than or equal to the threshold, determine that the authentication succeeds; and
  otherwise, determine that the authentication fails.

12. A voiceprint authentication method, comprising:
  receiving a user's voices in different speaking modes;
  extracting respective sets of voice features from the user's voices in the different speaking modes, said extracting further comprising extracting a first set of features of the sets of voice features from the user's voices in a first speaking mode based on a first algorithm, and extracting a second set of features of the sets of voice features from the user's voices in a second algorithm;
  generating a first voiceprint template derived from the sets of voice features by synthesizing the respective sets of the voice features; and
  sending the first voiceprint template to a server to authenticate the user, wherein the user's voices and the respective sets of the voice features are not sent to the server.

13. The method of claim 12, wherein
  the first algorithm comprises a linear prediction cepstrum coefficient algorithm; and
  the second algorithm comprises a mel frequency cepstral coefficient algorithm.

14. The method of claim 12, wherein synthesizing the respective sets of voice features further comprises:
  synthesizing the respective sets of the voice features with a voice synthesis algorithm based on a log magnitude approximate vocal tract model, so as to obtain a synthesized voiceprint.

15. The method of claim 14, wherein synthesizing the respective sets of the voice features with the voice synthesis algorithm based on the log magnitude approximate vocal tract model so as to obtain the synthesized voiceprint further comprises:
  for a fundamental tone signal corresponding to the user's voices, using log magnitude approximate filters with linear prediction cepstrum coefficient parameters to process voiced sound therein, and using log magnitude approximate filters with mel frequency cepstral coefficient parameters to process unvoiced sound therein, so as to obtain a synthesized voiceprint.

16. The method of claim 14, wherein generating the first voiceprint template by synthesizing the respective sets of the voice features further comprises:
  extracting an i-vector from the synthesized voiceprint, as the first voiceprint template.

17. The method of claim 14, wherein the synthesized voiceprint is sent to the server as the first voiceprint template.

18. The method of claim 12, further comprises:
  sending an authentication request to the server;
  receiving different speaking modes preselected and stored in association with the user and a first challenge code from the server; and
  presenting the different speaking modes and the first challenge code to the user enabling the user to read the first challenge code in the different speaking modes respectively to produce the user's voices in the different speaking modes.

19. The method of claim 12, further comprises:
  in a registration process, presenting a second challenge code and a user interface enabling the user to select different speaking modes respectively;
  receiving the user's voices in the selected different speaking modes;
  extracting respective sets of voice features from the user's voices in the selected different speaking modes;
  generating a second voiceprint template by synthesizing the respective sets of voice features; and sending the second voiceprint template to the server to be stored in association with the user, wherein the user's voices and the respective sets of the voice features are not sent to the server.

20. The method of claim 12, wherein the different speaking modes comprise any two or more of speaking in different languages, speaking in different dialects, singing and reading poetry.

* * * * *